United States Patent
Yi et al.

(10) Patent No.: US 11,428,538 B2
(45) Date of Patent: Aug. 30, 2022

(54) VEHICLE DETOUR MONITORING

(71) Applicant: Beijing DiDi Infinity Technology and Development Co., Ltd., Beijing (CN)

(72) Inventors: Zihan Yi, Mountain View, CA (US); Dong Li, Santa Clara, CA (US); Jing Chen, Palo Alto, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 349 days.

(21) Appl. No.: 16/718,063

(22) Filed: Dec. 17, 2019

(65) Prior Publication Data

US 2021/0180964 A1     Jun. 17, 2021

(51) Int. Cl.
*G01C 21/34*     (2006.01)

(52) U.S. Cl.
CPC ..... *G01C 21/3415* (2013.01); *G01C 21/3484* (2013.01)

(58) Field of Classification Search
CPC .............. G01C 21/3415; G01C 21/3484
USPC ............................................. 701/47
See application file for complete search history.

(56) References Cited

U.S. PATENT DOCUMENTS

| | | | | |
|---|---|---|---|---|
| 5,774,073 A * | 6/1998 | Maekawa | ......... | G01C 21/3415 340/990 |
| 2013/0110392 A1* | 5/2013 | Kosseifi | ............ | G01C 21/3415 701/410 |
| 2016/0069689 A1 | 3/2016 | Ikavalko et al. | | |
| 2016/0265930 A1* | 9/2016 | Thakur | ................ | G05D 1/0088 |
| 2017/0184409 A1* | 6/2017 | Glasgow | .............. | G08G 1/0133 |
| 2017/0186315 A1* | 6/2017 | Glasgow | .............. | G08G 1/0969 |
| 2017/0254653 A1* | 9/2017 | Min | ..................... | G01C 21/3492 |
| 2018/0143033 A1* | 5/2018 | Hu | ..................... | G01C 21/3484 |
| 2018/0283895 A1* | 10/2018 | Aikin | ................... | G08G 1/0104 |
| 2019/0193731 A1* | 6/2019 | Irie | ........................ | G08G 1/167 |
| 2020/0240791 A1* | 7/2020 | Patault | ............... | G01C 21/3492 |
| 2020/0240805 A1* | 7/2020 | Kanajan | ............ | G06Q 30/0645 |
| 2020/0376989 A1* | 12/2020 | Simecek | ............... | B60N 2/995 |

(Continued)

FOREIGN PATENT DOCUMENTS

| CN | 109671182 A | 4/2019 |
|---|---|---|
| CN | 109949030 A | 6/2019 |
| CN | 110232474 A | 9/2019 |

OTHER PUBLICATIONS

PCT International Search Report and the Written Opinion dated Mar. 17, 2021, issued in related International Application No. PCT/CN2020/136880 (10 pages).

*Primary Examiner* — Yazan A Soofi
*Assistant Examiner* — Christopher Chao
(74) *Attorney, Agent, or Firm* — Sheppard Mullin Richter & Hampton LLP

(57) ABSTRACT

A route may be recommended, and it may be determined if a vehicle detours from the recommended route. At least one recommend route may be obtained. A current route of a vehicle may be obtained. A variance value may be determined based on the current route and the at least one recommend route. The variance value may be compared to a threshold. It may be determined whether the variance value exceeds the threshold. If the variance value exceeds the threshold, it may be determined that the vehicle has detoured. If the variance value does not exceed the threshold, it may be determined that the vehicle has not detoured.

20 Claims, 5 Drawing Sheets

(56) References Cited

U.S. PATENT DOCUMENTS

2021/0016687 A1\* 1/2021 Van Hoecke .......... B60N 2/242
2021/0178936 A1\* 6/2021 Yetukuri ................. B60N 2/12

\* cited by examiner

VEHICLE DETOUR MONITORING

TECHNICAL FIELD

The disclosure relates generally to determining if a vehicle detours in a ride sharing platform.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

A claimed solution rooted in computer technology overcomes problems specifically arising in the realm of computer technology. In various implementations, a computing system may comprise one or more processors and one or more non-transitory computer-readable memories coupled to the one or more processors and configured with instructions executable by the one or more processors. Executing the instructions may cause the system to perform operations. The operations may include obtaining at least one recommend route. The operations may further include obtaining a current route of a vehicle. The operations may further include determining a variance value based on the current route and the at least one recommend route. The operations may further include comparing the variance value to a threshold. If the variance value exceeds the threshold, it may be determined that the vehicle has detoured. If the variance value does not exceed the threshold, it may be determined that the vehicle has not detoured.

In another aspect of the present disclosure, a method may include obtaining at least one recommend route. The method may further include obtaining a current route of a vehicle. The method may further include determining a variance value based on the current route and the at least one recommend route. The method may further include comparing the variance value to a threshold. If the variance value exceeds the threshold, it may be determined that the vehicle has detoured. If the variance value does not exceed the threshold, it may be determined that the vehicle has not detoured.

Yet another aspect of the present disclosure is directed to a non-transitory computer-readable storage medium configured with instructions executable by one or more processors to cause the one or more processors to perform operations. The operations may include obtaining at least one recommend route. The operations may further include obtaining a current route of a vehicle. The operations may further include determining a variance value based on the current route and the at least one recommend route. The operations may further include comparing the variance value to a threshold. If the variance value exceeds the threshold, it may be determined that the vehicle has detoured. If the variance value does not exceed the threshold, it may be determined that the vehicle has not detoured.

In some embodiments, the variance value may include a weighted sum. Determining the variance value may include mapping the at least one recommended route onto a set of recommended geohash squares. At least one set of neighboring geohash squares may be determined. At least one score may be obtained based on the set of recommended geohash squares, the at least one set of neighboring geohash squares, and the current route of the vehicle. The weighted sum may be computed based on the at least one score and at least one weight.

In some embodiments, a first score of the at least one score may be obtained based on the set of recommended geohash squares. A second score of the at least one score may be obtained based on the first set of neighboring geohash squares, wherein each geohash squares in the first set of neighboring geohash squares is adjacent to at least one geohash square in the set of recommended geohash squares. A third score of the at least one score may be obtained based on the second set of neighboring geohash squares, wherein each geohash squares in the second set of neighboring geohash squares is adjacent to at least one geohash square in the first set of neighboring geohash squares. A weighted first score may be calculated based on the first score and a first weight of the at least one weight. A weighted second score may be calculated based on the second score and a second weight of the at least one weight. A weighted third score may be calculated based on the third score and a third weight of the at least one weight. In some embodiments, the first, second, and third weight may be preset so that a greater weighted sum corresponds with a greater deviation from the recommended route. A weighted sum may be computed based on a summation of at least the weighted first score, the weighted second score, and the weighted third score.

In some embodiments, the at least one score may be based on a total amount of time the vehicle spent in geohash squares of the set of recommended geohash squares and the at least one set of neighboring geohash squares.

In some embodiments, the at least one score may be based on a number of geohash squares of the set of recommended geohash squares and the at least one set of neighboring geohash squares the vehicle entered.

In some embodiments, the current route may be compared to at least one historical route in response to determining the vehicle has detoured. A weak alert may be generated in response to determining that the current route matches a historical route of the at least one historical route. A strong alert may be generated in response to determining that the current route does not match a historical route of the at least one historical route.

In some embodiments, the threshold is based on historical factors.

In some embodiments, the variance value may be compared to a high threshold. A strong alert may be generated if the variance value exceeds the high threshold, a strong alert.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ride sharing platform by finding suspicious detours. The real-time status of each trip may be monitored based on the route which each vehicle takes. The real-time route of a vehicle may be compared to a recommended route for the trip. If the difference is greater than a threshold amount, it may be determined that the vehicle has detoured. For example, drivers who unnecessarily detour for more money may be identified. Misuse by business passengers may also be identified. For example, a passenger may be given a free ride to or from a place of business through enterprise pay. Misuse of the enterprise pay for personal trips may be identified. In addition, trip analysis may be performed using the collected data. The results of the analysis may be used to improve driver efficiency. For example, drivers may be directed from "cold" zones without many actual and/or potential passengers to "hot" zones with many actual and/or potential passengers. A detour may indicate that an incident has occurred (e.g., an incident by a passenger against a driver, an incident by a driver against a passenger) and/or may occur soon. An incident may be a physical incident (e.g., property losses, physical harms to drivers or passengers). Drivers may detour before or after an incident is committed. The safety of the ride sharing platform, and/or or other features of the ride sharing platform (e.g., computational efficiency), may be improved by determining when a vehicle detours.

Figure 1:
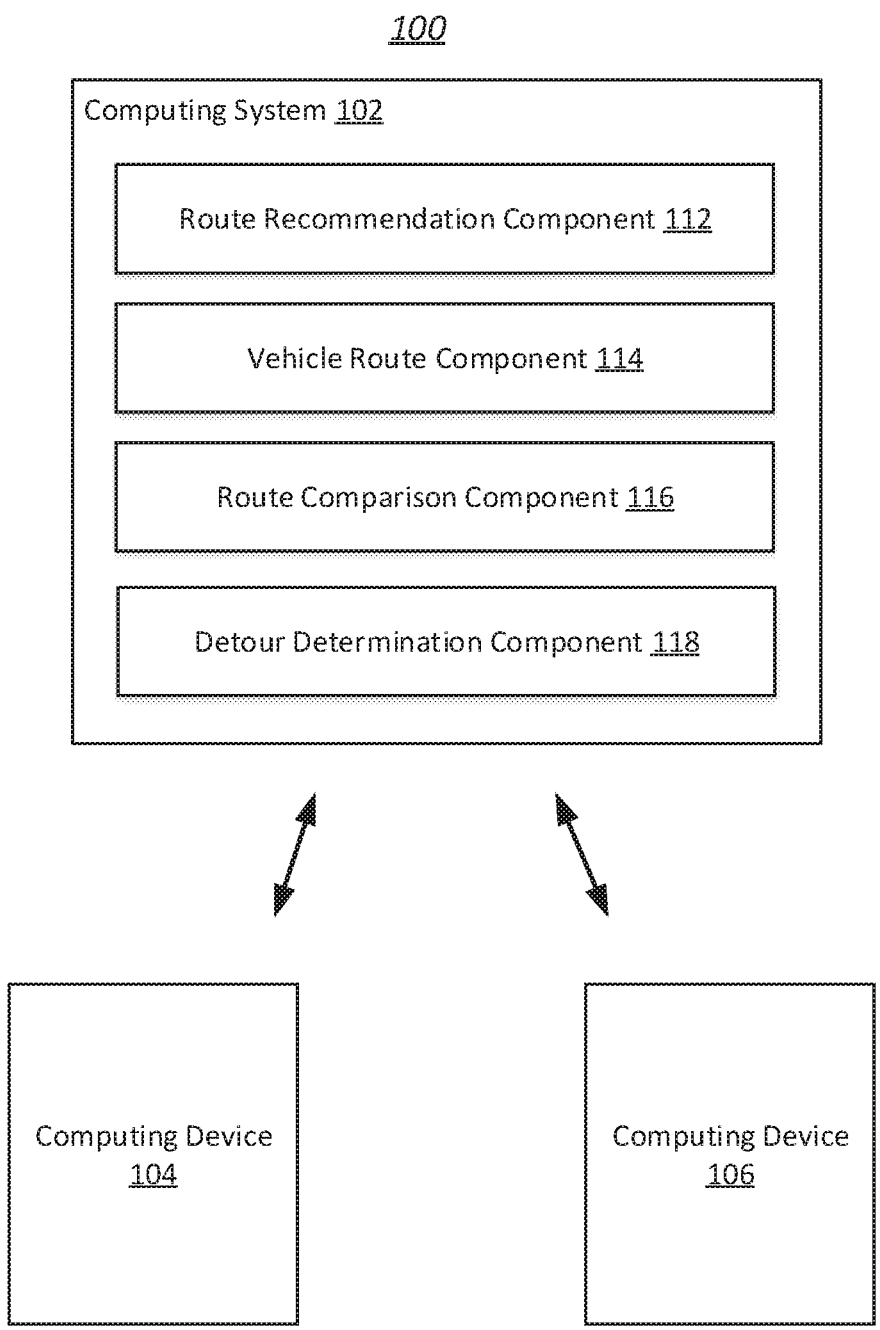
FIG. 1 illustrates an example environment to which techniques for determining detours may be applied, in accordance with various embodiments.

FIG. 1 illustrates an example environment 100 to which techniques for determining detours may be applied, in accordance with various embodiments. The example environment 100 may include a computing system 102, a computing device 104, and a computing device 106. It is to be understood that although two computing devices are shown in FIG. 1, any number of computing devices may be included in the environment 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The computing devices 104 and 106 may be implemented on or as various devices such as mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 communicate with each other through computing system 102, and may communicate with each other directly. Communication between devices may occur over the internet, through a local network (e.g., LAN), or through direct communication (e.g., BLUETOOTH™, radio frequency, infrared).

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include a route recommendation component 112, a vehicle route component 114, a route comparison component 116, and a detour determination component 118. The computing system 110 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 102 may include other computing resources. In some implementations, computing system 102 may comprise a single self-contained hardware device configured to be communicatively coupled or physically attached to a component of a computer system. In some implementations, computing system 102 may include an application specific integrated circuit (ASIC) or a field-programmable gate array (FPGA) configured to perform transaction verification operations associated with one or more decentralized applications. The computing system 102 above may be installed with appropriate software (e.g., platform program, etc.) and/or hardware (e.g., wires, wireless connections, etc.) to access other devices of the environment 100.

The route recommendation component 112 may be configured to obtain at least one recommend route. The at least one recommend route may be obtained in response to a request for a trip. For example, a user may order a trip through a ride sharing platform. Multiple recommended routes may be generated for each trip request in the ride sharing platform. A driver may be allowed to choose a route from the list of recommended routes. In some embodiments, routes may be recommended based on the shortest distance or travel time from a starting point to a destination. In some embodiments, the starting point may be based on a location of a mobile device of the user requesting the route. In some embodiments, the starting point may be selected by the user through the ride sharing platform. In some embodiments, the destination may be selected by the user through the ride sharing platform. In some embodiments, the at least one recommend route may be updated during a trip.

In some embodiments, external factors may be considered when recommending routes. External factors may be grouped based on whether they preexist at the time an order for a trip is placed, or whether the external factors occur after the order has been placed. For example, external factors preexisting at the time the order is placed may include weather (raining, snowing, clear, temperature), time of day (6:01 am, 9:00 pm, morning, night), road condition (wet, icy, flooded, clear), construction, and preexisting accidents. These preexisting external factors may be considered when providing the at least one recommended route after the order is placed and before the trip begins. They are usually consistent throughout a trip. For example, a longer route may be recommended during peak hours to avoid road with high congestion. In another example, a route may be recommended to avoid a winding road when it is raining or snowing.

Examples of external factors occurring after the order has been placed may include a road closure, traffic, or a recent car accident along the recommended route. These real time external factors may be used to update the at least one recommend route after a recommended route has been select. New routes may be recommended in the middle of a trip in real time (e.g., every 30 seconds, every minute). Real time external factors cannot be considered when initially recommending routes. For example, an accident may occur along the route during the trip. The at least one recommend route may be updated to avoid the accident.

The vehicle route component 114 may be configured to obtain a current route of a vehicle. In some embodiments, the current location of the vehicle may be obtained in real time (e.g., once every second). In some embodiments, the location of the vehicle may correspond with the location of one of devices 104 and 106. For example, the location of the vehicle may include GPS coordinates received from the vehicle or a phone of the driver. All of the obtained locations of the vehicle may be compiled into the current route.

Figure 2A:
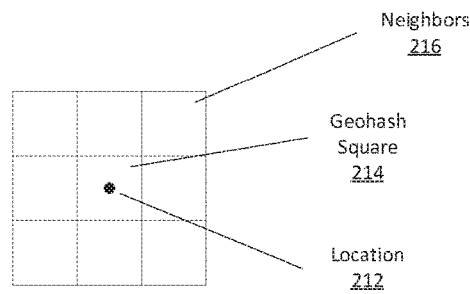
FIG. 2A illustrates an exemplary geohash location, in accordance with various embodiments.

The route comparison component 116 may be configured to determine a variance value based on the current route and the at least one recommend route. In some embodiments, the variance value may be based on geohash squares crossed by the current route and the at least one recommend route. Geohash squares may correspond to an encoding of a geographical location. The geohash squares may include a longitude code and a latitude code. The length of the longitude and latitude codes may affect the precision of the location. More precision may be achieved by using longer the longitude and latitude codes, resulting in smaller the geohash squares. Geohash square 214 shown in FIG. 2A is an example of a geohash square.

In some embodiments, the at least one recommended route may be mapped onto a set of recommended geohash squares. For example, each location (e.g., one per foot, one per meter) along the at least one recommended route may be mapped to a geohash square. If there is more that one recommended route, each location along each route may be mapped to a geohash square. The crossed geohash squares may be compiled into the set of recommended geohash squares. Each of the geohash squares in the set of recommended geohash squares may be annotated to indicate that the at least one recommended route crosses the square. For example, each of the geohash squares may be annotated with the color grey or the number one.

In some embodiments, at least one set of neighboring geohash squares may be determined. The at least one set of neighboring geohash squares may be determined may include multiple sets of neighboring geohash squares. In some embodiments, a first set of neighboring geohash squares of the at least one set of neighboring geohash squares may comprise geohash squares which are adjacent to at least one geohash square in the set of recommended geohash squares. In some embodiments, a second set of neighboring geohash squares of the at least one set of neighboring geohash squares may comprise geohash squares which are adjacent to at least one geohash square in the first set of neighboring geohash squares. In some embodiments, a geohash square may be considered to be adjacent to another geohash square if the geohash square is one of the eight geohash square surrounding the other geohash square. For example, the first set of neighboring geohash squares may correspond to neighbors 216 shown in FIG. 2A. Although only a first and second set of neighboring geohash squares are described, it is to be understood that any number of sets of neighboring geohash squares may be determined.

In some embodiments, each of the geohash squares in the at least one set of neighboring geohash squares may be annotated to indicate the distance from the geohash square to the closest recommended geohash square. For example, each of the geohash squares first set of neighboring geohash squares may be annotated with the color blue or the number two. Furthermore, each of the geohash squares first set of neighboring geohash squares may be annotated with the color yellow or the number three. In addition, annotations red and green or four and five may be used geohash squares with corresponding distances from the recommended geohash squares. The grid of geohashes may update in response to external factors In some embodiments, the variance value may comprise a weighted sum. The weighted sum may be computed based on the at least one score and at least one weight. In some embodiments, at least one score may be obtained based on the set of recommended geohash squares, the set of neighboring geohash squares, and the current route of the vehicle. In some embodiments, a first score of the at least one score may be obtained based on the set of recommended geohash squares. In some embodiments, a second score of the at least one score may be obtained based on the first set of neighboring geohash squares. In some embodiments, a third score of the at least one score may be obtained based on the second set of neighboring geohash squares.

In some embodiments, the at least one score may be based on a total amount of time the vehicle spent in geohash squares of the set of recommended geohash squares and the at least one set of neighboring geohash squares. For example, a first score may include the amount of time the vehicle spent in the recommended geohash squares, a second score may include the amount of time the vehicle spent in geohash squares neighboring the recommended geohash squares, and so on. In some embodiments, the at least one score may be based on a number of geohash squares of the set of recommended geohash squares and the at least one set of neighboring geohash squares the vehicle entered. For example, a first score may include the number of the recommended geohash squares the vehicle entered, a second score may include the number of geohash squares neighboring the recommended geohash squares the vehicle entered, and so on.

In some embodiments, a weighted sum may be computed based on a summation of at least a weighted first score, a weighted second score, and a weighted third score. The weighted first score may be calculated based on the first score and a first weight of the at least one weight. The weighted second score may be calculated based on the second score and a second weight of the at least one weight. The weighted third score may be calculated based on the third score and a third weight of the at least one weight. In some embodiments, the first, second, and third weight may be preset so that a greater weighted sum corresponds with a greater deviation from the recommended route. For example, the weighed sum may be calculated as follows:

$$\text{Weighted Sum} = w_1 \times \text{score}_1 + w_2 \times \text{score}_2 + w_3 \times \text{score}_3 + w_4 \times \text{score}_4 + w_5 \times \text{score}_5$$

Where:

$$0 \leq w_1 \leq w_2 \leq w_3 \leq w_4 \leq w_5$$

The route comparison component 116 may further be configured to compare the variance value to a threshold. In some embodiments, the threshold may be set to minimize the number of false alerts. A false alert may be an alert that is generated during a trip in which a rider safely and timely arrives at a destination without an incident occurring. For example, the threshold may be set so that a small detour does not trigger an alert. A small detour may have a low weighted sum because of the different weights assigned to different level deviation from the recommended route.

In some embodiments, the threshold may be based on historical factors. Historical factors may include routes previously taken by other drivers which pass through the start and end geohash squares. For example, routes passing through certain areas may have a higher variance. This may result in a higher threshold. Historical factors may include a history of the current driver. A driver history may include a safety history of the driver, a rating of the driver, good feedback, past complaints, and a history of detouring for more money. The threshold may allow drivers to choose routes which are better than the recommended routes without triggering an alert.

In some embodiments, the threshold may be based on a history of the rider. For example, a higher threshold may be used to account for passengers asking the driver to detour. In some embodiments, the threshold may be based on the external factors described above with respect to the route recommendation component 112. For example, the threshold may be higher for a longer estimated travel time. In some embodiments, the threshold may be calculated once at the beginning of the trip and remain fixed. In some embodiments, the threshold may be calculated in real time in response to updated external factors.

The detour determination component 118 may be configured to determine the vehicle has detoured if the variance value exceeds the threshold. In some embodiments, after it has been determined that the vehicle has detoured, the current route may be compared to at least one historical route. A weak alert may be generated in response to determining that the current route matches a historical route of the at least one historical route. A strong alert may be generated in response to determining that the current route does not match a historical route of the at least one historical route.

In some embodiments, the variance value may be compared to multiple levels of thresholds. As the weighted sum exceeds different thresholds, the trip will be regarded as off-track in different levels, and trigger different levels of alerts. For example, the variance value may be compared to a high threshold. If the variance value exceeds the high threshold, a strong alert may be generated. The strong alert may be generated without comparing the current route to historical routes. In some embodiments, an outer limit of geohash squares around the at least one recommended route may be determined. If the vehicle enters the outer limit of geohash squares, a strong alert may be generated.

The detour determination component 118 may further be configured to determine the vehicle has not detoured if the variance value does not exceed the threshold. In response to determining that the vehicle has not detoured, computing system 102 may continue to monitor the vehicle. In some embodiments the current route of the vehicle may be compared to the threshold in real time (e.g., once every second).

FIG. 2A illustrates an exemplary geohash location, in accordance with various embodiments. Location 212 may comprise an geographical location (e.g., point on a map). Location 212 may correspond to a coordinate with longitude and latitude values. Location 212 may be positioned within geohash square 214. The size of geohash square 214 may depend on the size of data representing geohash square 214. Location 212 may be positioned anywhere inside geohash square 214, and may still be represented by the same location value. Neighbors 216 may include the geohash squares which are adjacent to geohash square 214. Neighbors 216 may include the eight geohash square surrounding geohash square 214.

Figure 2B:
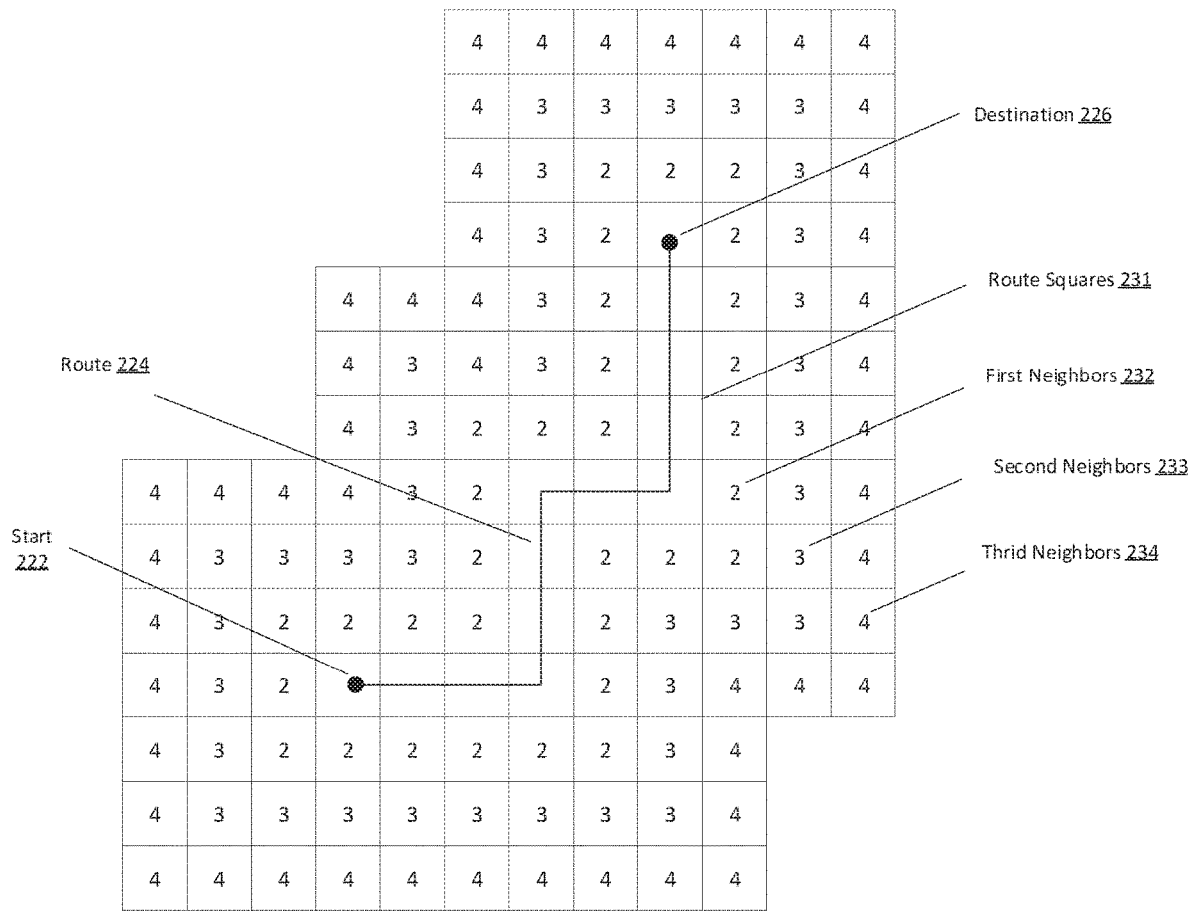
FIG. 2B illustrates an exemplary route, in accordance with various embodiments.

FIG. 2B illustrates an exemplary route, in accordance with various embodiments. The data shown in FIG. 2B and presented below is intended to be illustrative. A route 224 from start 222 to destination 226 is shown. Route 224 may correspond to a route requested through a ride sharing application. Route squares 231 may include geohash squares which route 224 passed through. For example, each location (e.g., one per foot, one per meter) along route 224 may be determined. A geohash square may be determined for each location, and route squares 231 may include the determined geohash squares. First neighbors 232 may include the geohash squares adjacent to route squares 231. Second neighbors 233 may include the geohash squares adjacent to first neighbors 232. Third neighbors 234 may include the geohash squares adjacent to first neighbors 233.

Figure 3:
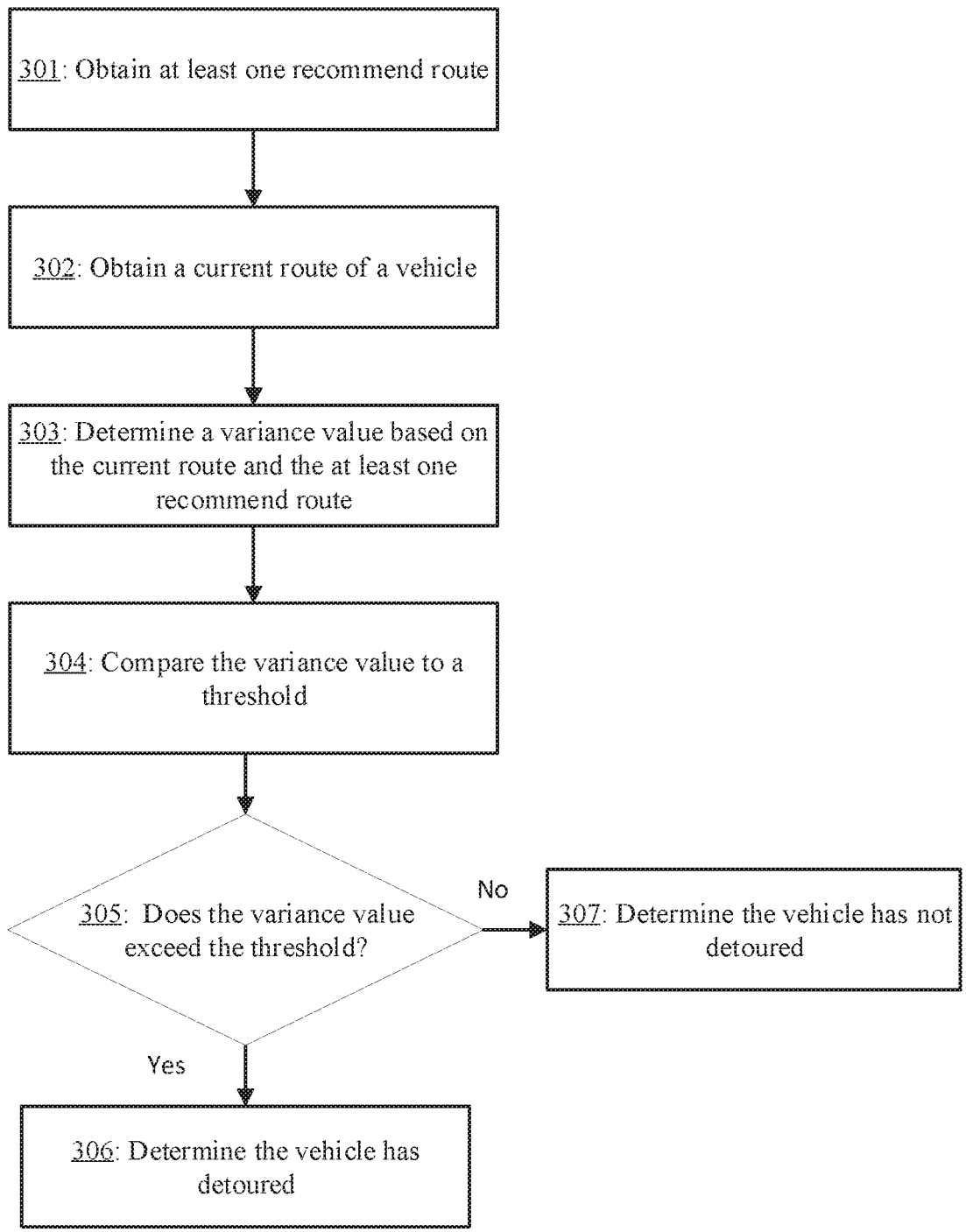
FIG. 3 illustrates a flowchart of an example method for determining detours, according to various embodiments of the present disclosure.

FIG. 3 illustrates a flowchart of an example method 300 for determining detours, according to various embodiments of the present disclosure. The method 300 may be implemented in various environments including, for example, the environment 100 of FIG. 1. The operations of the method 300 presented below are intended to be illustrative. Depending on the implementation, the method 400 may include additional, fewer, or alternative steps performed in various orders or in parallel. The method 400 may be implemented in various computing systems or devices including one or more processors.

With respect to the method 300, at block 301, at least one recommend route may be obtained. At block 302, a current route of a vehicle may be obtained. At block 303, a variance value may be determined based on the current route and the at least one recommend route. At block 304, the variance value may be compared to a threshold. At block 305, it may be determined whether the variance value exceeds the threshold. If the variance value exceeds the threshold, the method may proceed to block 306. If the variance value does not exceed the threshold, the method may proceed to block 307. At block 306, it may be determined that the vehicle has detoured. At block 307, it may be determined that the vehicle has not detoured.

Figure 4:
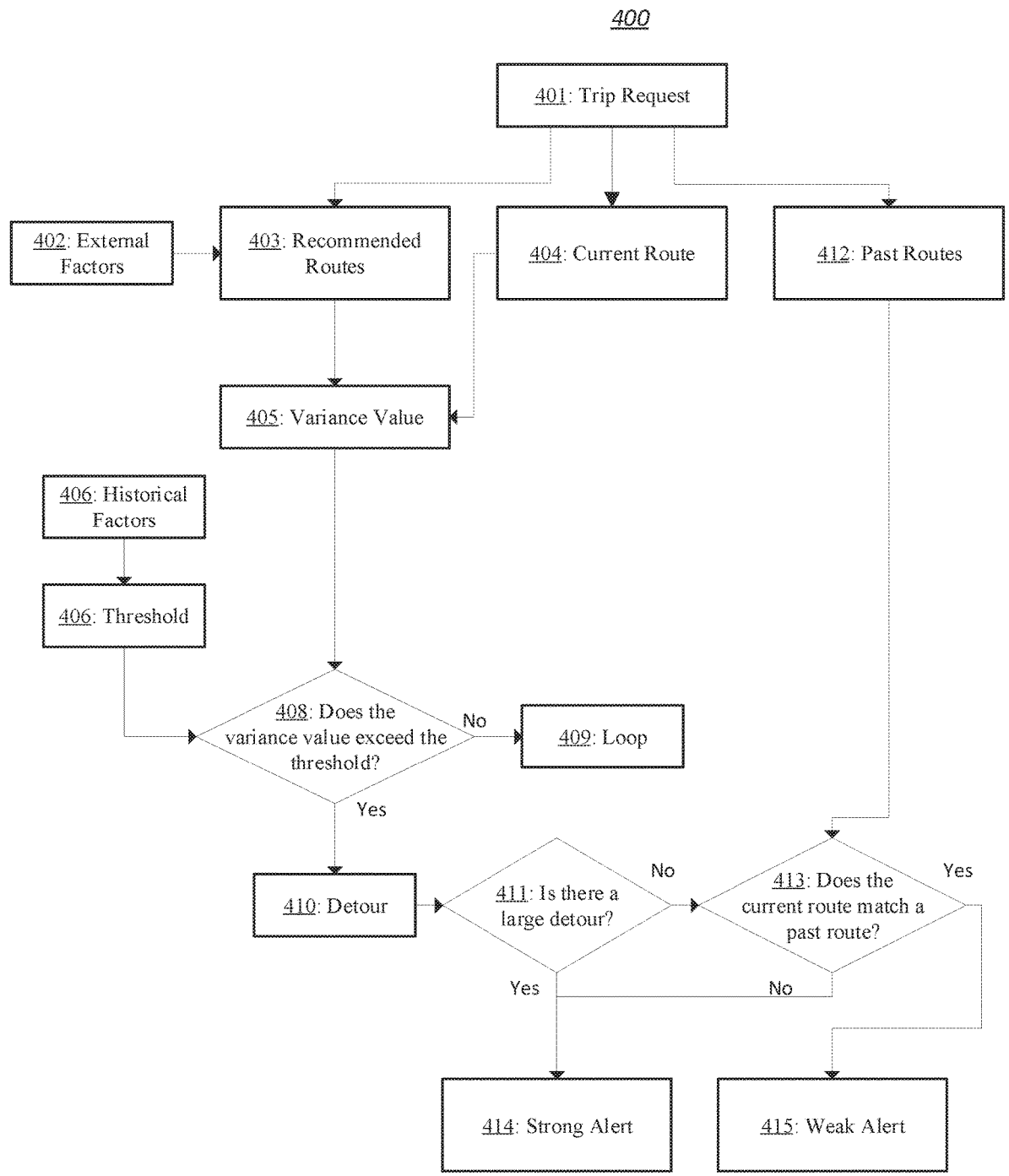
FIG. 4 illustrates a flowchart of an example method for determining detours, according to various embodiments of the present disclosure.

FIG. 4 illustrates a flowchart of an example method 400 for determining detours, according to various embodiments of the present disclosure. The method 400 may be implemented in various environments including, for example, the environment 100 of FIG. 1. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 401, a ride sharing platform may receive a request for a trip. At block 402, external factors may be obtained. At block 403, routes may be recommended based on the trip request and the external factors. At block 404, a current route of the vehicle may be obtained. At block 405, a variance value may be determined based on the current route and the at least one recommend route. At block 406, historical factors may be obtained. At block 407, a threshold may be determined based on the historical factors.

At block 408, it may be determined whether the variance value exceeds the threshold. If the variance value does not exceed the threshold, the method may proceed to block 409. If the variance value exceeds the threshold, the method may proceed to block 410. At block 409, the method may loop and perform detour determination again. For example, new external factors may be obtained in real time (e.g., every second, every 30 seconds). The recommended routes may update periodically (e.g., every second, every 30 seconds) or when new external factors are obtained. New variance values may be computed as the current route progresses. For example, a variance value may be determined once every second regardless of whether the recommended routes update. In some embodiments, the threshold may be updated. The variance value may be compared to the threshold until the trip finished.

At block 410, it may be determined that the vehicle has detoured. At block 411, it may be determined whether the detour is large. If the detour is large, the method may progress strait to block 414 and generate a strong alert. If the detour is not large, the method may proceed to block 413. At block 412, past routes may be obtained. At block 413, it may be determined whether the current route matches a past route. If the current route does not match a past route, the method may proceed to block 414 and generate a strong alert. If the current route matches a past route, the method may proceed to block 415 and generate a weak alert.

Figure 5:
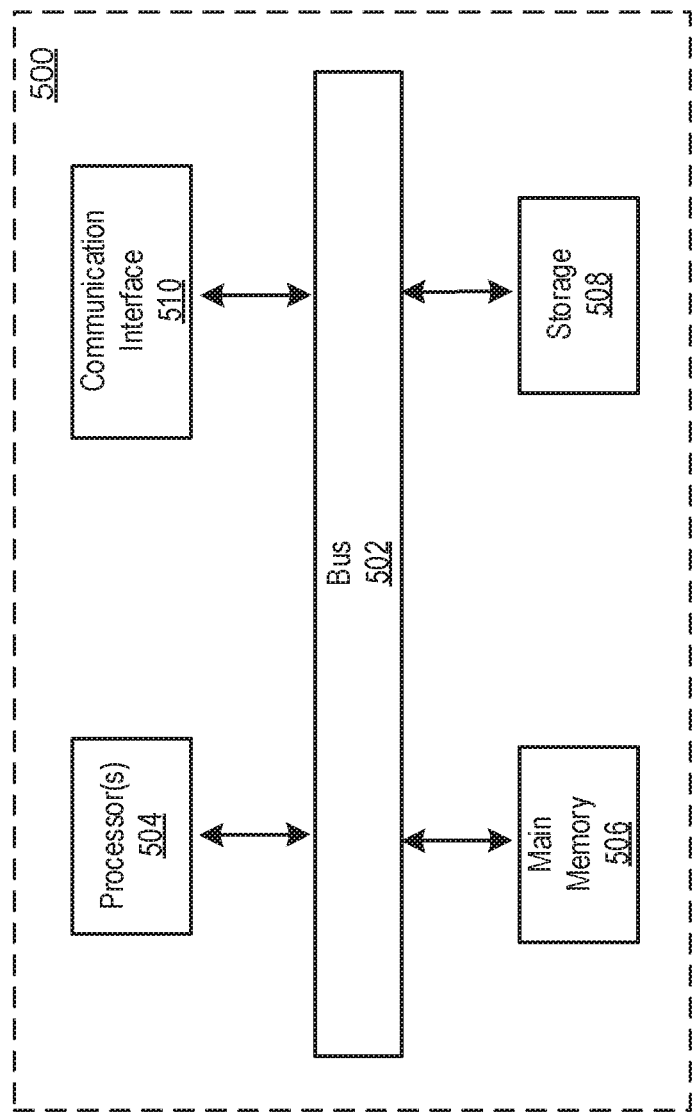
FIG. 5 is a block diagram that illustrates a computer system upon which any of the embodiments described herein may be implemented.

FIG. 5 is a block diagram that illustrates a computer system 500 upon which any of the embodiments described herein may be implemented. For example, the computer system 500 may be any one of the computing system 102 and the computing devices 104 and 106. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement computing system 102, computing device 104, and computing device 106 shown in FIG. 1. In another example, the computing system 500 may be used to implement the one or more components of the computing system 102 shown in FIG. 1. As another example, the process/method shown in FIG. 3, FIG. 4, and described in connection with this figure may be implemented by computer program instructions stored in main memory 506. When these instructions are executed by processor(s) 504, they may perform the steps as shown in FIG. 3 and FIG. 4, and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 110 may be described as performing or configured for performing an operation, when the components may comprise instructions which may program or configure the computing system 110 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for determining vehicle detour, comprising one or more processors and one or more non-transitory computer-readable memories coupled to the one or more processors and configured with instructions executable by the one or more processors to cause the system to perform operations comprising:
    obtaining, from a mobile device of a user requesting transportation, a location of the mobile device as a starting point;
    generating a recommended route for a vehicle to provide the transportation based at least on a shortest distance or travel time from the starting point to a destination;
    obtaining, in real time, GPS coordinates of the vehicle from the vehicle or a mobile device of a driver of the vehicle;
    determining, in real time, a current route of the vehicle based on the GPS coordinates;
    mapping the recommended route onto a grid of geohash squares to obtain a set of recommended geohash squares that the recommended route passes through;
    determining a first set and a second set of neighboring geohash squares of the recommended geohash squares, wherein each of the first set of neighboring geohash squares is adjacent to at least one of the recommended geohash squares, each of the second set of neighboring geohash squares is adjacent to at least one of the first set of neighboring geohash squares, the second set of neighboring geohash squares are further away from the recommended geohash squares than the first set of neighboring geohash squares;
    during the transportation, updating the recommended route at least at every second based on one or more new external factors including a road closure, traffic, or accident;
    during the transportation, updating the set of recommended geohash squares and the first set and the second set of neighboring geohash squares at least at every second based on the updated recommended route;
    determining, based at least on the current route, time of the vehicle travelling in the updated set of recommended geohash squares and the updated first set and the updated second set of neighboring geohash squares respectively;
    determining a variance value based at least on the determined time;
    comparing, in real time, the variance value to a threshold; and
    determining, if the variance value exceeds the threshold, the vehicle has detoured.

2. The system of claim 1, wherein the variance value comprises a weighted sum, and wherein determining the variance value comprises:
    obtaining at least one score based on the updated set of recommended geohash squares, the updated first set and the updated second set of neighboring geohash squares, and the current route of the vehicle; and
    computing the weighted sum based on the at least one score and at least one weight.

3. The system of claim 2, wherein the operations further comprise:
    obtaining a first score of the at least one score based on the updated set of recommended geohash squares;
    obtaining a second score of the at least one score based on the updated first set of neighboring geohash squares;
    obtaining a third score of the at least one score based on the updated second set of neighboring geohash squares of the at least one set of neighboring geohash squares;
    calculating a weighted first score base on the first score and a first weight of the at least one weight;
    calculating a weighted second score base on the second score and a second weight of the at least one weight;
    calculating a weighted third score base on the third score and a third weight of the at least one weight; and
    computing the weighted sum based on a summation of at least the weighted first score, the weighted second score, and the weighted third score.

4. The system of claim 2, wherein the at least one score is based on a total amount of time the vehicle spent in geohash squares of the updated set of recommended geohash squares and the updated first set and the updated second set of neighboring geohash squares.

5. The system of claim 2, wherein the at least one score is based on a number of geohash squares of the set of recommended geohash squares and the at least one set of neighboring geohash squares the vehicle entered.

6. The system of claim 1, wherein the operations further comprise:
    comparing, in response to determining the vehicle has detoured, the current route to at least one historical route of the vehicle;
    generating, in response to determining that the current route matches a historical route of the at least one historical route, a weak alert; and
    generating, in response to determining that the current route does not match the historical route of the at least one historical route, a strong alert.

7. The system of claim 1, wherein the threshold is based on historical factors.

8. The system of claim 1, wherein the operations further comprise:
    comparing the variance value to a high threshold; and
    generating, if the variance value exceeds the high threshold, a strong alert.

9. A method, comprising:
obtaining, from a mobile device of a user requesting transportation, a location of the mobile device as a starting point;
generating a recommended route for a vehicle to provide the transportation based at least on a shortest distance or travel time from the starting point to a destination;
obtaining, in real time, GPS coordinates of the vehicle from the vehicle or a mobile device of a driver of the vehicle;
determining, in real time, a current route of the vehicle based on the GPS coordinates;
mapping the recommended route onto a grid of geohash squares to obtain a set of recommended geohash squares that the recommended route passes through;
determining a first set and a second set of neighboring geohash squares of the recommended geohash squares, wherein each of the first set of neighboring geohash squares is adjacent to at least one of the recommended geohash squares, each of the second set of neighboring geohash squares is adjacent to at least one of the first set of neighboring geohash squares;
determining, based at least on the current route, time of the vehicle travelling in the set of recommended geohash squares and the first set and the second set of neighboring geohash squares respectively;
determining a variance value based at least on the determined time;
comparing, in real time, the variance value to a threshold; and
determining, if the variance value exceeds the threshold, the vehicle has detoured.

10. The method of claim 9, wherein the variance value comprises a weighted sum, and wherein determining the variance value comprises:
obtaining at least one score based on the set of recommended geohash squares, the first set and the second set of neighboring geohash squares, and the current route of the vehicle; and
computing the weighted sum based on the at least one score and at least one weight.

11. The method of claim 10, wherein the method further comprises:
obtaining a first score of the at least one score based on the set of recommended geohash squares;
obtaining a second score of the at least one score based on the first set of neighboring geohash squares;
obtaining a third score of the at least one score based on the second set of neighboring geohash squares of the at least one set of neighboring geohash squares;
calculating a weighted first score base on the first score and a first weight of the at least one weight;
calculating a weighted second score base on the second score and a second weight of the at least one weight;
calculating a weighted third score base on the third score and a third weight of the at least one weight; and
computing the weighted sum based on a summation of at least the weighted first score, the weighted second score, and the weighted third score.

12. The method of claim 10, wherein the at least one score is based on a total amount of time the vehicle spent in geohash squares of the set of recommended geohash squares and the first set and the second set of neighboring geohash squares.

13. The method of claim 10, wherein the at least one score is based on a number of geohash squares of the set of recommended geohash squares and the at least one set of neighboring geohash squares the vehicle entered.

14. The method of claim 9, wherein the method further comprises:
comparing, in response to determining the vehicle has detoured, the current route to at least one historical route of the vehicle;
generating, in response to determining that the current route matches a historical route of the at least one historical route, a weak alert; and
generating, in response to determining that the current route does not match the historical route of the at least one historical route, a strong alert.

15. The method of claim 9, wherein the threshold is based on historical factors.

16. The method of claim 9, wherein the method further comprises:
comparing the variance value to a high threshold; and
generating, if the variance value exceeds the high threshold, a strong alert.

17. A non-transitory computer-readable storage medium configured with instructions executable by one or more processors to cause the one or more processors to perform operations comprising:
obtaining, from a mobile device of a user requesting transportation, a location of the mobile device as a starting point;
generating a recommended route for a vehicle to provide the transportation based at least on a shortest distance or travel time from the starting point to a destination;
obtaining, in real time, GPS coordinates of the vehicle from the vehicle or a mobile device of a driver of the vehicle;
determining, in real time, a current route of the vehicle based on the GPS coordinates;
mapping the recommended route onto a grid of geohash squares to obtain a set of recommended geohash squares that the recommended route passes through;
determining a first set of neighboring geohash squares of the recommended geohash squares;
during the transportation, updating the recommended route based on one or more new external factors including a road closure, traffic, or accident;
during the transportation, updating the set of recommended geohash squares and the first set of neighboring geohash squares based on the updated recommended route;
determining, based at least on the current route, time of the vehicle travelling in the updated set of recommended geohash squares and the updated first set of neighboring geohash squares respectively;
determining a variance value based at least on the determined time;
comparing, in real time, the variance value to a threshold; and
determining, if the variance value exceeds the threshold, the vehicle has detoured.

18. The non-transitory computer-readable storage medium of claim 17, wherein the variance value comprises a weighted sum, and wherein determining the variance value comprises:
obtaining at least one score based on the updated set of recommended geohash squares, the updated first set of neighboring geohash squares, and the current route of the vehicle; and
computing the weighted sum based on the at least one score and at least one weight.

19. The non-transitory computer-readable storage medium of claim 18, wherein the operations further comprise:
  obtaining a first score of the at least one score based on the updated set of recommended geohash squares;
  obtaining a second score of the at least one score based on the updated first set of neighboring geohash squares;
  calculating a weighted first score base on the first score and a first weight of the at least one weight;
  calculating a weighted second score base on the second score and a second weight of the at least one weight; and
  computing the weighted sum based on a summation of at least the weighted first score, and the weighted second score.

20. The non-transitory computer-readable storage medium of claim 17, wherein the operations further comprise:
  comparing, in response to determining the vehicle has detoured, the current route to at least one historical route of the vehicle;
  generating, in response to determining that the current route matches a historical route of the at least one historical route, a weak alert; and
  generating, in response to determining that the current route does not match the historical route of the at least one historical route, a strong alert.

* * * * *